United States Patent Office 2,924,521
Patented Feb. 9, 1960

2,924,521

NATURAL FLAVOR OF PROCESSED FOODS

Eric J. Hewitt, Tarrytown, N.Y., Torsten Hasselstrom, Framingham, Mass., Donald A. M. Mackay, Pleasantville, N.Y., and Kurt S. Konigsbacher, Stamford, Conn.

No Drawing. Application December 12, 1958
Serial No. 779,807

32 Claims. (Cl. 99—1)

This invention relates to novel improved processed foods having improved flavor and to a novel method of producing said improved processed foods with improved flavor. The term "processed food" as used herein means a food which has been treated by inactivating some or all of the enzymes present therein, for the purpose of preserving the food during storage. This application is a continuation-in-part of application Serial No. 587,944, filed May 29, 1956, now abandoned.

The characteristic flavor of a fresh food can mainly be attributed to two different types of ingredients—(1) those materials which impart to the food its distinctive taste, and (2) those components which impart to the food its characteristic odor or what may be termed volatile flavor. Both types of materials result from normal metabolic processes in the organism. These flavor components like all other metabolic products are believed to be formed by the action of enzymes naturally occurring in the food. These enzymes, which are naturally occurring proteinaceous materials, do not in themselves form a part of the flavor ingredients but are mere catalytic agents effectuating the necessary action for the production of the flavor components.

It is well known to process perishable foods to preserve them during storage. The stabilizing is done by inactivating completely or substantially enzymes, bacteria and other microorganisms present in the food. Usually, food is stabilized by a heat processing operation such as by blanching wherein the food is subjected to wet heat consisting usually of hot water or steam. The blanched food is then subjected to further processing (e.g. sulfiting, dehydration, freezing) to prevent or retard chemical changes and growth of bacteria, fungi and microorganisms on storage. In the canning of food, blanching, cooking and sterilizing steps are done simultaneously with one heat treatment by hermetically sealing the food in a container in the presence of water and subjecting it to heat treatment. Another technique for destroying enzymes and bacteria in the preservation of food is to subject the food to an irradiation treatment.

The presently used techniques for processing foods do not produce processed foods which are entirely satisfactory. Unfortunately the overall effect of processing food is deleterious to the flavor as compared with the flavor of the fresh food, so that the desirable effects of increased stability are obtained at the expense of the fresh flavor. One need only compare freshly plucked cooked peas with canned peas, or fresh orange juice with frozen or canned orange juice, or dried apricots with fresh apricots to observe great differences in flavor.

The chief reason why the natural flavor of processed foods is greatly lessened is that many of the flavor components, and in particular the odor flavor components, are volatile or heat labile. While respect to the taste flavor, many of these components may be relatively non-volatile, relatively heat stable components which survive the processing operation. In general, the processing operation seriously affects if not destroys the odor of the food and in many instances, e.g. irradiation, substantially affects the flavor by the creation of off flavors.

The processed food industry has, in certain cases, tried to overcome these disadvantages in flavor by the use of natural or synthetic flavor fortifiers. However, fortification with such flavors may present serious problems with respect to Government regulations such as those of the Food and Drug Administration. In many cases, however, these fortified foods are lacking the natural flavors and qualities of the fresh material. Where natural flavors are used to fortify, costs increase as a result of cannibalizing. Moreover, in certain instances, such as in canning, the natural or synthetic flavors would have to be added to the food before processing and would be subject to the same losses as the flavors of the fresh material.

Objects and advantages of the invention will be set forth in part hereinafter and in part will be obvious herefrom, or may be learned by practice with the invention, the same being realized and attained by means of the steps, processes, compositions, combinations and improvements described herein and defined in the appended claims.

An object of this invention is to provide novel improved processed edible foods having improved natural flavor with respect to both taste and odor. A further object of this invention is to provide novel improved processed edible foods having a natural flavor with respect to both taste and odor such that the improved processed food closely resembles fresh food. A still further object of this invention is to provide novel improved processed edible foods which exhibit a high natural flavor comparable to the fresh food without having incorporated therein fortifying natural or synthetic flavors. Yet a further object of this invention is to provide a novel method for producing improved processed foods having the attributes set forth in the foregoing objects.

It has been found that the objects of this invention may be realized by bringing into contact with a processed food in the presence of water a specific enzyme having the necessary activity. This invention is based on the discovery that in the processing of food—although a large amount of the patent natural flavor is destroyed, there may remain components representing a source of latent flavor, which may be termed "flavor precursors" which when activated by specific enzymes convert the latent flavor into patent natural flavor. In other words, it has been found that (1) certain relatively non-volatile, relatively heat stable compounds—flavor precursors—survive the food processing steps, and (2) such flavor precursors under the influence of specific enzymes are converted to natural flavor whereby the improved processed food is enhanced in fresh taste and odor.

As will be understood by those skilled therein, enzyme chemistry is a most complex field. Most enzymes are of unknown structure and can only be described in terms of their activity, often highly specific, in the presence of a substrate on which they exert their enzymatic or catalytic effects. This commonly accepted method of defining or describing enzymes will be used in describing the enzymes of the present invention. Accordingly, the "enzymes" of the present invention are those enzymes capable of acting upon the flavor precursors in order to convert latent flavor to patent natural flavor. A "processed food" as used throughout the specification and claims means a food which has been treated to preserve it from deterioration on storage by the inactivation of some or all of the enzymes present therein. "Flavor precursors" as used in this invention means those components capable of acting as a substrate and which, on the addition of specific enzymes to the processed food, are converted from latent flavor to patent natural flavor. An "improved processed food" as used herein means a processed food which has been treated in accordance with this invention.

It should be realized that the latent flavor provided by specific flavor precursors in a particular processed food is only converted to the patent natural flavor by specific enzymes. In all cases, these enzymes may be obtained from the same fresh food. The enzyme preparation obtained from a member of the same biological family in some instances converts the latent flavor of the processed food to the patent natural flavor of the food; in other instances, it converts it to a flavor which is somewhere between that of the untreated food and that of the food from which the enzyme preparation has been obtained. The enzyme may be obtained from an animal, plant or microbial source or combination thereof.

Relative to testing for the presence of our specific enzymes, the following procedure may be used:

A preliminary screening for enzyme activity is made. The procedures used to extract our specific enzymes will also extract other enzymes, including catalase and peroxidase. There are simple, colorimetric tests which can be used for these enzymes, e.g. the pyrogallol test, which is based on the formation of purpurogallin from pyrogallol (Willstatter and Stoll; Ann. V. 416, page 21, 1917), in which the material to be tested is treated with pH 7 (phosphate) buffered hydrogen peroxide and pyrogallol. If the test is negative for the presence of catalase and peroxidase, it may be assumed that the less stable enzymes are also absent. If the test is positive, then our enzymes may be present. However, the only true test for our enzymes is their ability to convert latent flavor into patent flavor.

The preliminary screening is just a guide and may be omitted, as the latter test is the one specific to the activity of our enzyme preparations.

The effect of adding flavor producing enzymes to processed foods is easiest to observe when the flavor, especially odor, level of the processed food is low, and the flavor, especially odor, level of the fresh food is high and distinctive. Sometimes, when the processed food has a high flavor level of its own it is difficult to observe changes in flavor due to the enzyme treatment. However, in such cases we found that by removing the flavor (especially the odor) of the processed food in such a manner as not to remove the precursors, we obtain a product highly suitable for demonstrating the principle of the invention and for testing the presence of an active, flavor producing enzyme.

Thus, when fresh onions were blanced in steam for two to three minutes to inactivate enzymes, then juiced with pressure and the juice filtered through charcoal, an almost odorless filtrate was obtained with no characteristic onion odor and only slight onion taste. The flavorless enzyme preparation was prepared by the following method. The juice of fresh unblanched onions was extracted and treated with cold acetone. This gave a precipitate which was dissolved in water and re-precipitated with cold acetone. This cycle was repeated until a completely odorless, tasteless, flavorless product was obtained. Equal amounts of this enzyme-containing preparation were added to two beakers, one containing pure water and the other an equal amount of the "deflavorized" processed onion preparation. An equal portion of the deflavorized processed onion preparation was left untreated to act as a control. The beaker containing the deflavorized processed onion plus the enzyme preparation produces a strong typical onion odor and taste within a few minutes. The contents of the other two beakers (used as controls) remained odorless and showed no increase in faint onion taste. Similar experiments have been carried out with bananas, spinach, tomatoes, leeks, parsley, pea pods, pineapples, watercress, strawberries, cabbage, celery, and in all cases similar effects were observed.

In order to illustrate the preparation of similar deflavorized substrates (flavor precursors) to be acted on by enzymes in accordance with the present invention the following detailed examples are given:

EXAMPLE 1

This example illustrates the preparation of a crude substrate from tomatoes:

Three tomatoes are sliced and blanched for 5-10 minutes in an Arnold sterilizer. The slices are next minced finely in a Waring Blendor with 200 ml. of water. The slurry is filtered twice through a filter formed by eight layers of cheesecloth. The filtrate is stirred with a mixture of an absorptive grade charcoal and "Celite" for several minutes and filtered with suction or pressure. A clear flavorless substrate is obtained.

EXAMPLE 2

This example illustrates the preparation of a substrate from dehydrated onions:

Dehydrated onions (10 g.) are blanched in an Arnold sterilizer for 3 minutes, dried and ground in a mortar. Water (50 ml.), charcoal (1 g.) and "Celite" (1 g.) are added, the slurry is stirred for several minutes and filtered with suction. This treatment is repeated until the filtrate is substantially flavorless.

Additional Examples 3–12 for the preparation of substrates are summarized in Table I below. These examples were prepared in accordance with the method described in Example 1 but where filtration through the cheesecloth was not feasible, the slurry was separated by centrifugation at 2,000 r.p.m. for 5 minutes.

Tables I

| Ex. | Substrate | Quantity | Blanch Time (Min.) | Water Added to Waring Blendor (ml.) | Charcoal Added (grams) | Celite Added (grams) | Frequency of Treatment |
|---|---|---|---|---|---|---|---|
| 3 | pea pods | ¼ lb | 10 | 200 | 2 | 3 | Once. |
| 4 | celery | 3 lg. stalks | 10 | 100 | 2 | 3 | Do. |
| 5 | leek | ½ lb | 10 | 200 | 3 | 4 | Three Times. |
| 6 | cabbage | 2 lbs | 10 | 500 | 3 | 3 | Once. |
| 7 | spinach | ½ lb | 5 | 75 | 2 | 3 | Three Times. |
| 8 | pineapples | 1 lb | 10 | 200 | 2 | 2 | Four Times. |
| 9 | oranges | 2 med. Fla. | 5 | 100 | 1 | 4 | Once. |
| 10 | bananas | 2 large | 5 | 250 | 2 | 4 | Three Times. |
| 11 | parsley | ¼ lb | 5 | 100 | 2 | 2 | Once. |
| 12 | strawberries | 1 pint | 5 | 150 | 3 | 3 | Four Times. |

The following examples illustrate one of the methods of obtaining enzyme preparations to be used in accordance with this invention. Other methods such as alcohol precipitation, low temperature evaporation, freeze drying, adsorption and elution off adsorbents or salt precipitation may also be used.

EXAMPLE 13

This example illustrates the method of obtaining a tomato enzyme preparation.

Three sliced tomatoes are minced finely in a Waring Blendor with 200 ml. of water, the mixture being cooled with solid carbon dioxide. The slurry is filtered through a filter made up of eight layers of cheesecloth. The filtrate is well chilled and added to an equal volume of acetone prechilled with solid carbon dioxide. The reaction mixture is centrifuged at 2,000 r.p.m. for 5 minutes and the supernatant is discarded. The centrifugate is redissolved in ice-cold water and precipitated as above. The centrifuge is finally dried in a pre-chilled desiccator under vacuum.

Enzyme preparations of the following were prepared in the manner described in Example 13:

Pea pods, strawberry, celery, parsley, leek, onion, spinach, pineapple, orange, white mustard, cabbage seed, cabbage leaf, banana, watercress, and fresh unpasteurized milk.

It will be noted that in the examples of plants, with the exception of pea pods, the enzyme preparation is obtained from a part of the plant which is usually considered to be edible. As exemplified by pea pods, however, in many instances, the enzyme preparation may be obtained from a part of the plant that is not usually considered edible. Other examples of normally considered non-edible materials which may be used for obtaining enzyme preparations are watercress seeds, carrot tops, celery leaves, cabbage cores, pineapple skins, etc. In the examples of animals, the enzyme is obtained from an edible part of the animal. However, in addition to these sources, i.e. plants and animals, the enzymes may be obtained from a microbial source.

In order to ascertain which microbial source contains the desired enzyme or enzymes the usual screening procedures are used. If the enzyme activity is of a known reaction, the screening procedure is more simple; if it is not, the screening becomes more extensive and time consuming. Screening procedures have been used extensively in the search for new antibiotics. The major difference between antibiotics and enzyme surveys is that in the latter both filtrate and cells are assayed. In both cases, cultures may be obtained from collections such as American Type Culture Collection, Centraalbureau Voor Schimmelcultures or U.S. Department of Agriculture. In addition isolants from nature are made in the usual procedure of dilution in agar media in Petri plates and picking isolated colonies.

Procedures may be used similar to Routien's research for Terramycin (Routien and Finlay, Bacterial Review, v. 16, pp. 51–57, 1952), Pfizer's for anticancer antibiotic compounds (Chemical Week, January 11, 1958, page 65), or Dworschack's procedure for screening for an enzyme—in this case a proteolytic enzyme—(Dworschack, Koepsell and Lagoda, Archives of Biochemistry and Biophysics, v. 41, page 48, 1952).

The source of cultures depends upon the enzyme desired; if the survey were for lactase, samples may be taken from lactase containing materials. Since many enzymes are adaptive, it is obvious to try cultures obtained from the substrate; in such case it may be fresh food, old, stale or contaminated food or soil or other samples to which the substrate (either purified substrate or the food itself) has been added.

Once the cultures are obtained they may be assessed by a number of procedures. Horizontal agar diffusion assays, which are used for antibiotics, may be modified for use in enzyme assessments. Dingle (Dingle, Journal of the Science of Food and Agriculture, v. 4, pp. 139–155) has used these in testing for starch hydrolyzing enzymes and Cort (Cort, Journal of Bacteriology, page 141, 1955), has used similar tests for lactase and lactase oxidase. In addition, many other enzyme assay procedures can be used and these are reviewed by Colowick and Kaplan (Colowick and Kaplan, Methods in Enzymology, Academic Press, Inc., New York, 1955).

Screening may also be done in stages; stage one may be a fermentation to select those cultures which will use a given substrate on the assumption that at least some of these will have the specific enzyme system wanted. Secondary tests are run to determine which have a good source of the enzyme.

In general, the procedure may be accomplished as follows:

(1) Use stock cultures or isolants.
(2) Grow these on nutrient media and substrate.
(3) Lyophilize cells and extract these or use some other mechanism (sand, silica, Mickel tissue disintegrator, ultrasonics, etc.) to change cell permeability. Test these and the filtrates (non-cellular) from the fermentations for enzymes.

The following procedure was employed in testing the improvement in natural flavor by the addition of the enzyme preparation to the substrate containing the food precursors:

A small quantity of enzyme preparation is weighed into each of two beakers. Distilled water is added to one and an aliquot of flavorless substrate to the other. A third beaker contains nothing but an aliquot of substrate. The beakers are covered and allowed to stand for a period of 5 to 15 minutes at room temperature.

The odor and taste of the suspensions or solutions is then observed by a minimum of 3 qualified judges. The enzyme was considered to have affected the flavor positively if the sample containing both enzyme and substrate was found to be distinctly different in flavor from the two negative controls (substrate alone, enzyme alone). Of course, as will be understood by those in the field, the more active the enzyme the less amount thereof is required to effectuate the desired flavor enhancement.

Table II which follows summarizes the tests quantitatively. The amounts of enzyme used represent average quantities. In each of the Examples 14–27 shown in Table II, there was found to be an enhancement of natural flavor when the enzyme preparation was brought into contact with the substrate. Tests with several samples also indicate that the flavor enhancement can be observed over a period of 24 hours.

*Table II*

ENZYMATIC FLAVOR ENHANCEMENT

| Ex. | Raw Material for enzyme preparation | Enzyme Preparation (g.) | Raw Material for substrate | Substrate obtained (ml.) | Test Conditions | | |
|---|---|---|---|---|---|---|---|
| | | | | | Amt. enzyme used (mg.) | Amt. substrate used (ml.) | Enzyme per ml. of substrate (mg.) |
| 14 | onions (1 lb.) | 0.150 | dehydrated onion (10 g.) | 200 | 20 | 30 | 0.67 |
| 15 | tomatoes (2 lbs.) | 0.600 | tomatoes (2 lbs.) | 300 | 35 | 40 | 0.875 |
| 16 | bananas (0.75 lb.) | 2.000 | bananas (0.75 lb.) | 175 | 50 | 50 | 1.00 |
| 17 | parsley (0.25 lb.) | 0.075 | parsley (0.25 lb.) | 100 | 20 | 35 | 0.572 |
| 18 | leek (0.5 lb.) | 0.700 | leek (0.5 lb.) | 250 | 30 | 35 | 0.858 |
| 19 | spinach (0.5 lb.) | 1.000 | spinach (0.5 lb.) | 300 | 50 | 50 | 1.00 |
| 20 | pineapple (0.75 lb.) | 0.100 | pineapple (0.75 lb.) | 150 | 20 | 40 | 0.50 |
| 21 | strawberries (1 pint) | 0.700 | strawberries (1 pint) | 200 | 35 | 40 | 0.875 |
| 22 | celery stalks (3 large) | 0.200 | celery stalks (3 lg.) | 100 | 25 | 30 | 0.835 |
| 23 | pea pods (0.25 lb.) | 0.030 | pea pods (0.25 lb.) | 150 | 10 | 50 | 0.200 |
| 24 | watercress (0.5 lb.) | 0.100 | watercress (0.5 lb.) | 200 | 10 | 15 | 0.667 |
| 25 | unpasturized milk (16 oz.) | 2.000 | dry skim milk | 1,000 | 35 | 100 | 0.350 |
| 26 | mustard (80 g.) | 0.300 | dehydrated cabbage (2 g.) | 2 g. (reh.) | 25 | 1 g. (reh.) | 0.025 |
| 27 | cabbage (2 lb.) | 0.200 | cabbage (.65 lb.) | 250 | 20 | 40 | 0.50 |

It was found that the presence of an antibiotic in an improved processed food having an improved flavor in accordance with this invention is effective in maintaining flavor enhancement and preventing deleterious effects on the food. The incorporation of an antibiotic is particularly desirable in those cases where the rate of formation of the desirable flavor is slow compared to the rate of formation of undesirable products arising from the activity of microorganisms. The antibiotic may be incorporated in a number of different ways. It may be added to the enzyme preparation or the processed food or both before the processed food containing flavor precursor is combined with the enzyme preparation. Also, the antibiotic may be incorporated at the time when the processed food is combined with the enzyme preparation.

Example of the utilization of an antibiotic in a food having improved flavor in accordance with the present invention is as follows:

EXAMPLE 28

0.2 mg. of chlortetracycline hydrochloride (an antibiotic) was added to a suspension consisting of 30 mg. watercress substrate and 20 mg. watercress enzyme preparation and tested in the manner indicated heretofore for flavor enhancement. A good watercress flavor developed. A sample of the above described product and a control sample, identical thereto except that it contained no antibiotic, were allowed to stand at room temperature. After 36 hours the control sample had a strongly rotten flavor and looked very unappetizing. Surprisingly, however, the sample to which the antibiotic had been added had an excellent watercress flavor with no deterioration of the product. This was true even after standing for 5 days.

EXAMPLE 29

A sample was prepared in the same manner as in Example 28 except that onion substrate and onion enzyme preparation were used, in place of the watercress substrate and watercress enzyme preparations.

Results obtained with this composition when compared with a control were similar to the results obtained in the watercress composition.

In addition to the use of an antibiotic for preserving the enzyme preparation in the manner described above, other methods may be employed, such as subjecting the enzyme preparation to an irradiation treatment.

The following experiments show that the development of latent flavors is by specific enzymes and not enzymes in general.

The substrate prepared from dehydrated onions was treated with enzyme preparations from white mustard, onions and cabbage leaf. No flavor developed with the mustard and cabbage enzymes, but a typical onion flavor developed with the onion enzyme.

In a second experiment a substrate prepared from cabbage leaves was treated with enzymes prepared from white mustard, from cabbage seed, and from cabbage leaf. In each instance an enhanced flavor, but of different character, was noticeable. With the mustard enzyme a distinct pungency developed quickly; with cabbage seed enzyme a cabbage flavor having marked pungency developed, while with the cabbage leaf enzyme a true fresh flavor appeared. This difference is remarkable because the enzyme preparation obtained in each case supposedly contains the same enzyme called myrosinase. It will be noted that in each such case the enzyme was derived from a material from the same botanical family as that of the substrate, i.e. mustard and cabbage are both of the Brassica family. On the other hand, enzyme preparations obtained from onions and leek could be used interchangeably on onion and leek substrates without any observable difference in effect.

To further substantiate the claim that the flavor enhancement is an enzymatic phenomenon, several experiments on the stability of enzyme preparations were conducted. These included both pH stability and heat inactivation tests on the enzyme preparations obtained from food raw materials. Results are summarized in Tables III and IV. The data indicates that heating the enzyme preparation at 100° C. for 2 minutes inactivates the flavor producing enzymes, while a pH range below about 4 and above about 7 did affect activity of the particular enzyme preparations used.

Table III
STABILITY OF ENZYME PREPARATIONS TO HEAT

| Raw material | Amount of Enzyme used, mg. | Amount of Substrate used, ml. | pH Before Heating | pH After Heating | Time Heated at 100° C. (min.) | Odor |
|---|---|---|---|---|---|---|
| onion (control) | 8.1 | 15 | 5.6 | | | strong. |
| onion | 8.1 | 15 | 5.6 | 5.3 | 3 | none. |
| Do | 8.1 | 15 | 5.6 | 5.4 | 2 | Do. |
| watercress (control) | 10 | 15 | 6.0 | | | pungent. |
| watercress | 10 | 15 | 6.0 | 5.9 | 2 | none. |

Table IV
pH ACTIVITY RANGES FOR ONION AND WATERCRESS ENZYMES.

| Onion | | Watercress | |
|---|---|---|---|
| pH of Substrate | Flavor [1] | pH of Substrate | Flavor [1] |
| 2.0 | None. | 2.0 | None. |
| 3.0 | Weak onion. | 3.0 | Very weak watercress. |
| 4.0 | Medium onion. | 4.0 | Weak watercress. |
| 5.0 | Strong onion. | 5.0 | Strong watercress. |
| 6.0 | Very strong onion. | 6.0 | Do. |
| 7.0 | Do. | 7.0 | Do. |
| 8.0 | Weak onion. | 8.0 | Medium watercress. |
| 9.0 | Decayed onion. | 9.0 | Weak watercress. |
| 10.0 | Do. | 10.0 | Do. |
| 11.0 | Do. | 11.0 | Very weak watercress. |
| 12.0 | Do. | 12.0 | None. |

[1] Flavor observations after standing at room temperature for 60 minutes.

It is not necessary to use such artificially deflavored processed food preparations to demonstrate the effects of our invention. For example, fresh watercress was blanched in steam and dehydrated in an oven at about 65° C. for 2 hours. The dehydrated material was quite flavorless and had none of the characteristic bite and smell of watercress. On adding water to this material no change was observed, the dehydrated watercress smelling and tasting like hay. However, when an enzyme preparation from white mustard seeds (white mustard and watercress both belong to the Brassica family) was added to the dehydrated watercress in water, the typical odor and taste of watercress was quickly regained.

A similar effect was obtained with dehydrated cabbage (member of Brassica family). Commercially dehydrated cabbage also responded to the enzyme preparation from white mustard. Enzyme preparations from black mustard seeds and cabbage seeds also had an effect. In the legume family we found that an enzyme preparation obtained from dried string beans improved the natural flavor of commercially frozen peas.

Additional examples of food compositions prepared in accordance with the present invention are summarized in Table V below. The compositions containing enzyme preparations are compared in this table with like compositions containing no enzyme preparation. In obtaining the food preparations shown, the enzyme preparations made from the fresh fruit or vegetable (10 mg.) were added to the substrates prepared from fresh fruits and vegetables (av. 30 ml). The substrate in each case was macerated in a Warning Blendor before use. If not previously heated in processing, the footstuff was balanced in an Arnold Sterilizer for several minutes. In cases where the vegetable is not generally eaten raw, a sample with the raw flavor was used as the standard for comparing the enhanced samples.

Table V

| Substrate | Enzyme | Flavor Evaluation |
|---|---|---|
| Fresh carrot deflavorized [1] | | no odor, faint taste. |
| Do [1] | carrot | excellent carrot flavor. |
| Dehydrated carrot deflavorized [1] | | little flavor. |
| Do [1] | carrot | good carrot flavor. |
| Canned carrot [2] | | typical flavor. |
| Do [2] | carrot | increase in fresh flavor. |
| Canned carrot deflavorized [3] | | little flavor. |
| Do [3] | carrot | fresh carrot flavor. |
| Fresh stringbean deflavorized [1] | | little flavor. |
| Do [1] | stringbean | improved flavor. |
| Canned stringbean [2] | | typical flavor. |
| Do [2] | stringbean | definitely improved flavor. |
| Canned stringbean deflavorized [3] | | little flavor. |
| Do [3] | stringbean | improved flavor. |
| Dehydrated stringbean [4] | | slight burnt flavor. |
| Do [4] | stringbean | less burnt characteristics. |
| Fresh asparagus [4] | | grass-like flavor. |
| Do [4] | asparagus | more like fresh asparagus. |
| Canned asparagus [2] | | typical flavor. |
| Do [2] | asparagus | more like fresh asparagus. |
| Cooked asparagus deflavorized [3] | | typical flavor. |
| Do [3] | asparagus | more like fresh asparagus. |
| Canned beet [2] | | typical flavor. |
| Do [2] | beet | more like fresh beet. |
| Canned beet deflavorized [3] | | weak beet flavor. |
| Do [3] | beet | more like fresh beet. |
| Fresh beet [4] | | fresh beet flavor. |
| Do [4] | beet | slightly increased fresh flavor. |
| Fresh beet deflavorized [1] | | no flavor. |
| Do [1] | beet | fresh beet flavor. |
| Dehydrated beet [4] | | weak, burnt flavor. |
| Do [4] | beet | increased fresh flavor. |
| Dehydrated beet deflavorized [1] | | burnt flavor. |
| Do [1] | beet | increased fresh flavor. |
| Canned corn [2] | | fair cooked flavor. |
| Do [3] | corn | very slight change. |
| Fresh corn [4] | | bland. |
| Do [4] | corn | slight fresh flavor. |
| Canned pea [2] | | typical flavor. |
| Do [2] | pea | slightly fresher flavor. |
| Canned pea deflavorized [3] | | slight flavor. |
| Do [3] | pea | more fresh flavor. |
| Canned pea and carrot [2] | | cooked pea flavor. |
| Do [2] | pea, carrot | increased fresh carrot flavor. |
| Canned pea and carrot deflavorized [3] | | slight cooked pea flavor. |
| Do [3] | pea, carrot | good fresh carrot flavor. |
| Canned mixed vegetable [2] | | bland vegetable flavor. |
| Do [2] | carrot, pea, corn, pepper, celery, onion. | increase in sharpness. |
| Canned mixed vegetable [5] deflavorized [3] | | no flavor. |
| Do [3] | as above | grass-like flavor. |
| Frozen mixed vegetable, [4, 5] | | little flavor. |
| Do [4, 5] | carrot, pea, green bean, onion, corn. | good fresh vegetable flavor. |
| Frozen mixed vegetable [6] deflavorized [1] | | bland flavor. |
| Do [1] | as above | good fresh vegetable flavor. |
| Frozen strawberry [4] | | strawberry flavor. |
| Do [4] | strawberry | strawberry flavor. |
| Frozen strawberry deflavorized [1] | | sweetish flavor. |
| Do [1] | strawberry | more tart flavor. |
| Frozen pineapple deflavorized [1] | | sweetish flavor. |
| Do [1] | pineapple | slight pineapple flavor. |
| Fresh peach deflavorized [1] | | slight peach flavor. |
| Do [1] | peach | definite peach flavor. |
| Frozen peach [4] | | fair peach flavor. |
| Do [4] | peach | definite peach flavor. |
| Frozen peach deflavorized [1] | | slight peach flavor. |
| Do [1] | peach | definite peach flavor. |

[1] Filtered liquid substrate after blanching, followed by celite and charcoal treatment.
[2] Foodstuff minced in Waring Blendor and not deflavorized.
[3] Filtered liquid substrate after celite and charcoal treatment.
[4] Foodstuff blanched and minced in Waring Blendor and not deflavorized.
[5] Carrots, corn, peas, lima beans, celery, onion, peppers.
[6] Corn, peas, carrots, stringbeans, lima beans.

The following examples illustrated methods for enhancing the flavor of various processed foods.

EXAMPLE 30

Several raw carrots are blended in a Waring Blendor with a few cc. of water for about a minute and then filtered through cheesecloth. An equal volume of very cold ($-15°$ C.) acetone is added and the mixture centrifuged. The centrifugate is washed with 50% acetone, recentrifuged and dried in a Roto-vac. 20 mg. of the enzyme preparation thus obtained is added to 2 gms. of dehydrated carrots and 15 cc. of water at 30° C. The reaction mixture is allowed to stand for one hour. The flavor of the rehydrated carrots is more like that of fresh carrots.

EXAMPLE 31

100 gms. of raw stringbeans are passed through a Juicex extractor and the juice obtained is precipitated with an equal volume of very cold acetone. The precipitate is centrifuged and dried in a desiccator. 50 mg. of the enzyme preparation are added to 75 gms. of commercially canned stringbeans and 25 cc. of water. The mixture is incubated at 37° C. for 90 minutes. The fresh bean flavor of the canned beans is increased.

EXAMPLE 32

500 gms. of peas are blended in a Waring Blendor with very cold acetone. The mixture is filtered with suction and the residue is dried in a desiccator. The dry solid is treated in a Waring Blendor with very cold butanol and the resulting suspension is stirred for 15 minutes at room temperature. It is then filtered with suction, washed with very cold acetone and dried in a desiccator. 200 mg. of this enzyme preparation is added to 50 gms. of strained canned peas (baby food) and 5 cc. of water. The reaction is allowed to stand for 2 hours at 37° C. A fresh pea flavor is developed in the canned peas.

EXAMPLE 33

100 gms. of strawberries are blended in a Waring Blendor with an equal amount of very cold acetone for one minute. It is then filtered with suction, washed with cold acetone and dried in a desiccator. The dry powder is then treated in the Blendor with very cold butanol, stirred at room temperature for 30 minutes, filtered with suction, washed with butanol and dried in a desiccator. 35 mg. of the enzyme preparation thus obtained is added to 30 gms. of canned strawberries and 50 cc. of water. The reaction mixture is allowed to stand for 90 minutes. A fresh strawberry flavor is developed in the treated strawberries.

EXAMPLE 34

250 gms. of fresh pineapple is blended in a Waring Blendor with an equal amount of very cold acetone for several minutes. The mixture is then filtered with suction and washed with acetone. The precipitate is dried in a desiccator. The dry solid is then extracted with very cold butanol, stirred for 15 minutes at room temperature, filtered with suction and washed with cold butanol and acetone and dried in a desiccator. 10 mg. of the enzyme preparation is added to 50 gms. of canned pineapple and allowed to stand for 30 minutes at 35° C. The flavor of the canned pineapple becomes more like that of fresh pineapple.

EXAMPLE 35

500 cc. of raw milk is stripped of cream and mixed with enough acetic acid to lower the pH to 4.5. The suspension is centrifuged and the precipitate is discarded. The liquid phase is then added to an equal volume of very cold acetone and centrifuged. The centrifugate is washed with cold 50% acetone and recentrifuged. The centrifugate is then dried in a desiccator. 20 mg. of this enzyme preparation is added to 10 gms. of commercial powdered milk and 100 cc. of water. The mixture is allowed to stand for 30 minutes. The resulting flavor approaches that of fresh, raw milk.

EXAMPLE 36

250 gms. of blueberries are treated in a Waring Blendor with very cold acetone for one minute. The mixture is then filtered with suction, rewashed with acetone and dried in a desiccator. The dried precipitate is then extracted with very cold ether, filtered with suction, rewashed with ether and dried in a Roto-vac. 25 mg. of this enzyme preparation is added to 50 gms. of canned blueberries and 50 cc. of water and allowed to stand for 60 minutes. The treated canned blueberries develop the flavor of fresh blueberries.

EXAMPLE 37

500 gms. of broccoli are minced with 100 cc. of water in a Waring Blendor for several minutes, filtered through cheesecloth and added to an equal volume of very cold acetone and centrifuged. The centrifugate is rewashed with cold acetone, recentrifuged and dried in a Roto-vac. 25 mg. of the enzyme preparation is added to 50 gms. of thawed frozen broccoli and allowed to stand for 60 minutes. The resulting flavor resembles that of fresh broccoli.

EXAMPLE 38

500 gms. of peeled fresh oranges are treated in a Waring Blendor with an equal amount of very cold acetone for one minute. The mixture is then filtered with suction, washed with cold acetone and dried in a desiccator. The dry powder is then treated in the Blendor with cold butanol, stirred at room temperature for 30 minutes, filtered with suction, washed with butanol and dried in a desiccator. 20 mg. of the orange enzyme preparation is added to 20 gms. of powdered orange juice and 150 cc. of water and allowed to stand for 60 minutes. The flavor of the treated juice approaches that of fresh orange juice.

EXAMPLE 39

100 gms. of fresh salmon is minced frozen in a Waring Blendor. It is then thawed and thoroughly mixed with distilled water and allowed to stand for 90 minutes. The water mixture is then filtered through cheesecloth and two volumes of very cold acetone are added. This mixture is then centrifuged and lyophilized. 30 mg. of this enzyme preparation is added to 50 gms. of commercial canned salmon and 10 cc. of water and allowed to stand for 60 minutes. The enzyme treated salmon develops a more fishy and raw flavor.

EXAMPLE 40

Six egg yolks are mixed with citrate-phosphate pH 7 buffer and 2 volumes of very cold acetone are added. The mixture is then centrifuged and lyophilized. 25 mg. of the enzyme preparation is added to 25 gms. of commercial powdered eggs and 50 cc. of water and allowed to stand for 30 minutes. When the treated eggs are scrambled, the taste is more like that of scrambled fresh eggs.

EXAMPLE 41

300 gms. of fresh chicken are treated frozen in a Waring Blendor. After thawing, petroleum ether is added for defatting. The solvent is decanted as far as possible and the rest is evaporated at room temperature. Distilled water is added and the mixture is allowed to stand for about 90 minutes. The water mixture is then filtered through cheesecloth and two volumes of very cold acetone are added. The mixture is then centrifuged and lyophilized. 25 mg. of the enzyme preparation are added to 50 cc. of a chicken broth filtrate (which is prepared by boiling chicken in water for about two hours, cooling, blending and filtering) and allowed to stand for 30 minutes. The resulting flavor is a more definite chicken flavor.

EXAMPLE 42

100 gms. of raw wheat germ are ground in a Waring Blendor. It is then defatted by washing with petroleum ether. Two volumes of 1.7% sodium tetraborate solution are added and the mixture is allowed to stand for one hour on the shaker. The suspension is then filtered through cheesecloth and 2 volumes of very cold acetone are added to the filtrate. The mixture is then centrifuged and lyophilized. 25 mg. of the enzyme preparation is then added to 25 gms. regular Ralston wheat cereal and 100 cc. of water and allowed to stand for 30 minutes. The treated cereal is then cooked in the usual way. The resulting flavor is a stronger, cereal flavor.

EXAMPLE 43

500 gms. of raw, lean beef are treated in a Waring Blendor with added water. The mixture is then stirred in an ice bath for two hours and filtered through Celite. An equal volume of very cold acetone is added to the filtrate and the mixture is centrifuged and then dried in a desiccator. 50 mg. of this enzyme preparation is then added to 100 cc. of beef broth filtrate (which has been cooked in water for about 90 minutes, blended and filtered), and then allowed to stand for 30 minutes. The flavor of the treated broth has more of a bloody, raw meat taste.

EXAMPLE 44

300 gms. of sweet potatoes are minced frozen in a Waring Blendor. A citrate-phosphate, pH 7 buffer is added and the mixture is allowed to stand for 90 minutes. It is then filtered through cheesecloth and 2 volumes of very cold acetone are added. The mixture is then centrifuged and lyophilized. 20 mg. of the enzyme preparation is then added to 50 gms. of canned sweet potatoes and allowed to stand for 30 minutes. A stronger, sweet potato flavor results from the treatment.

EXAMPLE 45

100 gms. of raw celery are treated in a Waring Blendor with an equal volume of very cold acetone, filtered with suction. The residue is then washed with cold acetone and dried in a desiccator. The dry solids are then emulsified with very cold butanol, stirred at room temperature for 15 minutes, filtered with suction, washed with cold acetone and dried in a desiccator. 25 mg. of this enzyme preparation is added to 50 gms. of cooked celery and 100 cc. of water and allowed to stand for 30 minutes. The flavor of the treated celery approaches that of fresh celery.

EXAMPLE 46

100 gms. of fresh peaches are minced in a Waring Blendor and filtered through cheesecloth and added to an equal volume of very cold acetone. The mixture is then centrifuged, rewashed with acetone, recentrifuged and dried in a desiccator. 25 mg. of the enzyme preparation is added to 50 gms. of canned peaches and 100 cc. of water. The mixture is allowed to stand for 30 minutes. The resulting flavor is more like that of fresh peaches.

EXAMPLE 47

100 gms. of tangerine skin are treated in a Waring Blendor with equal amounts of very cold acetone for one minute. The suspension is then filtered with suction, washed with cold acetone and dried in a desiccator. The dried powder is treated in a Waring Blendor with very cold butanol, stirred at room temperature for 30 minutes and filtered with suction. It is then rewashed with butanol and dried in a desiccator. 20 mg. of the enzyme preparation is added to 200 gms. of canned tangerine juice. It is allowed to stand for 35 minutes, after which time the flavor of the treated juice approaches that of fresh tangerine juice.

EXAMPLE 48

500 gms. of outer cabbage leaves are treated in a Waring Blendor with very cold acetone and filtered with suction. The precipitate is washed with acetone and dried in a desiccator. The dry solids are extracted with very cold butanol and stirred for 30 minutes at room temperature and filtered with suction. It is re-washed with cold butanol and acetone, filtered with suction and dried in a desiccator. 25 mg. of this enzyme preparation is added to 50 gms. of dehydrated cabbage and 100 cc. of water. After standing for 20 minutes a flavor of fresh, raw cabbage develops.

EXAMPLE 49

300 gms. of peeled grapefruit are passed through a Waring Blendor and filtered through cheesecloth. An equal volume of very cold acetone is added to the filtrate and centrifuged. The centrifugate is washed with cold acetone, recentrifuged and dried in a Roto-vac. 25 mg. of the enzyme preparation is added to 50 gms. of canned grapefruit and 50 cc. of water and allowed to stand for 35 minutes. The treated canned grapefruit develops a flavor of fresh grapefruit.

EXAMPLE 50

50 grams of fresh horseradish are minced with Dry Ice. Dry cold ether is added and the ether mixture is allowed to stand for 10 minutes. The ether is decanted. This procedure is repeated twice more and the solids are finally filtered with suction and washed with cold acetone and dried in a desiccator. 20 mg. of the enzyme preparation is added to 25 gms. of dried horseradish and 50 cc. of water and allowed to stand for 10 minutes. The strong, odor and flavor of fresh horseradish develops.

EXAMPLE 51

50 gms. of peeled lemons are minced in a Waring Blendor at 10° C. and the suspension is filtered through cheesecloth and finally filtered with suction. 1.5 volumes of very cold acetone are added and the acetone mixture is centrifuged and dried in a desiccator. 20 mg. of the enzyme preparation is added to 50 cc. of commercial bottled lemon juice and 100 cc. of water and allowed to stand for 45 minutes. The treated juice assumes the flavor of fresh lemon juice.

EXAMPLE 52

50 gms. of garlic are minced in a Waring Blendor and filtered through cheesecloth. An equal volume of very cold acetone is added and the mixture is centrifuged. The centrifugate is washed with cold acetone, recentrifuged and dried in a Roto-vac. 15 mg. of this enzyme preparation are added to 15 gms. of a commercial garlic salt and 100 cc. of water and allowed to stand for 35 minutes. The flavor became more like that of freshly crushed garlic.

EXAMPLE 53

100 gms. of fresh beets are passed through a Juicex extractor and filtered through cheesecloth. An equal volume of very cold acetone is added and the mixture is centrifuged. The centrifugate is rewashed with cold acetone and recentrifuged. It is then dried in a desiccator. 25 mg. of this enzyme preparation is added to 45 gms. of canned beets and 100 cc. of water. After standing for 30 minutes, the canned beets develop a flavor of fresh beets.

EXAMPLE 54

150 gms. of fresh asparagus are passed through a Juicex extractor and filtered through cheesecloth. The filtrate is treated with an equal volume of very cold acetone and the precipitate is dried in a Roto-vac. 30 mg. of the enzyme preparation are added to 50 gms. of canned asparagus and 25 cc. of water and allowed to stand for 30 minutes. The canned asparagus flavor assumes a flavor of fresh asparagus.

EXAMPLE 55

200 gms. of corn kernels are treated in a Waring Blendor with very cold acetone and filtered with suction. The precipitate is washed with additional cold acetone and dried in a desiccator. 30 mg. of the enzyme preparation is added to 50 gms. of canned corn and 100 cc. of water. The mixture is allowed to stand for 30 minutes. The resulting flavor approaches that of fresh corn.

EXAMPLE 56

100 gms. of fresh apricots are blended in a Waring Blendor with an equal volume of very cold acetone. The mixture is then filtered with suction and washed with acetone. The precipitate is dried in a desiccator. 20 mg. of this enzyme preparation is then added to 50 gms. of commercially dried apricots and 100 cc. of water and allowed to stand for 1 hour. The treated rehydrated apricots develop a flavor of fresh apricots.

EXAMPLE 57

150 gms. of apples are minced in a Waring Blendor, and treated with 2 volumes of 1.7% solution of sodium tetraborate and allowed to stand on a shaker for one hour. The suspension is then filtered through cheesecloth and an equal volume of very cold acetone is added and the mixture is allowed to stand for 5 minutes and then centrifuged and dried in a desiccator. 25 mg. of the enzyme preparation are added to 25 gms. of dehydrated apples and 100 cc. of water. The mixture is allowed to stand for 60 minutes. The flavor of the rehydrated apples approaches that of fresh apples.

As indicated heretofore, it has been found that the presence of the flavor precursor is required in the processed food for the result of enzyme addition to be observable. It follows, therefore, for maximum effect the conditions of processing should be such that the precursor is preserved throughout processing to the greatest possible extent. Thus, it is possible by this invention to arrive at the processing treatment which gives the maximum flavor precursor survival. This is illustrated by the following example of processing watercress. It has been found that the enzyme in watercress responsible for converting the precursor to the flavor is very heat labile and that the usual commercial conditions of dehydration (65° C.) are sufficient to inactivate it. Thus, when unblanched watercress is dehydrated at this temperature the product is flavorless, and rehydration brings back no flavor. In addition, dehydrated steam blanched watercress and dehydrated hot water blanched watercress are also found to be bland and flavorless, both dry and upon rehydration. However, when an enzyme preparation from white mustard which belongs to the same botanical family as watercress is added to the water of rehydration a marked difference appears. The unblanched quickly regains its strong taste and odor. The steam blanched has, by comparison, a moderately strong regain, and the hot water blanched has only a weak regain of characteristic flavor. Moreover, the water used for the hot water blanch is flavorless, but a treatment with the enzyme preparation soon develops a strong watercress flavor in the water. Thus, the process using the hot water blanching has leached out some of the flavor precursor and reduced the amount of latent flavor of the processed watercress. This invention shows that steam blanching is to be preferred in this case although even this leads to some slight losses of flavor precursor. We found that steam blanching was also preferred with many other material, such as horseradish and carrots, but with some materials it did not seem to make any difference whether steam or hot water blanching was used. In the case of onion, for example, the precursor appeared to survive equally well under either condition.

There are other variables such as duration of blanching and dehydration temperature which may also affect the amount of precursor remaining in the processed materials. We have found, for example, that prolonged blanching resulted in a greater loss or precursor; also that higher dehydration temperatures produced the same result. Another consideration relative to the precursor is the found variations from type to type, season to season and locale to locale. Thus the amount of flavor created is dependent upon the manner of processing as well as the nature of the processed food.

In addition to the foregoing, a series of experiments were conducted utilizing commercially available enzymes, particularly proteases and pectinases, in combination with a substrate. From the results summarized in the following Table VI, it is seen that these enzymes did not enhance the flavor, thus indicating that specific enzymes are necessary for a substrate in order to convert the latent flavor to patent natural flavor.

Table VI

| Substrate Prepared From— | Enzyme Used | Flavor Developed |
|---|---|---|
| Dehydrated Onion | Papain [1] | None. |
| | Enzyme 165 [2] | Do. |
| | Enzyme MT 767 [2] | Do. |
| | Enzyme SA 767 [2] | Do. |
| | Lipase [3] | Do. |
| | Polidase-S [4] | Do. |
| | HT Proteolitic 200-F-6652 [5] | Do. |
| | Protease F-6220 [5] | Do. |
| | Peptizyme Conc. F-6500 [5] | Do. |
| Watercress | Papain [1] | Do. |
| | Enzyme 165 [2] | Do. |
| | Enzyme MT 767 [2] | Do. |
| | Enzyme SA 767 [2] | Do. |
| | Lipase [3] | Do. |
| | Polidase-S [4] | Do. |
| | HT Proteolitic 200-F-6652 [5] | Do. |
| | Protease F-6220 [5] | Do. |
| | Peptizyme Conc. F-6500 [5] | Do. |

[1] Difco Laboratories, Inc.
[2] Wallerstein Co., Inc.
[3] Delta Chemical Works.
[4] Schwarz Laboratories, Inc.
[5] Takamine Labs.

By the present invention it is possible to process food in a manner to yield a stable-to-storage food material and at the time of use to restore to the processed food natural flavor such that the improved processed food more closely resembles fresh food. In many cases where kept in dry state, the processed food (dry) can be intermixed with the enzyme preparation (dry) and packaged. In such instances, the user merely adds water to the intermixed composition to obtain improved processed food of high natural flavor by the action of the enzyme preparation on the processed food containing flavor precursor. In other cases wherein the processed food contains a significant amount of water, such processed food can be packaged together with but not in direct contact with the proper enzyme preparation. In this case, the user merely mixes the two component parts in the presence of water.

As will be understood by those in the field, the packaging of the processed food and the enzyme preparation may be accomplished in a number of different ways. For example:

The enzyme preparation may be contained in a water-soluble capsule and packaged with a dehydrated food so that on rehydration the enzyme preparation is liberated.

The enzyme preparation may be added in the form of a frozen aqueous solution to a frozen food and packaged together with it so that the enzyme preparation is liberated on thawing.

The enzyme preparation may be coated with ice and packaged with a frozen food so that the enzyme preparation is liberated on thawing.

The enzyme preparation may be intermixed directly with a dehydrated food and the mixture packaged as such, the enzyme preparation being activated on the addition of water.

The enzyme preparation may be packaged separately and said package secured in a suitable manner to a can of canned food.

The enzyme preparation may be packaged separately in a water-insoluble package and said package placed into a container together with a dehydrated food.

The enzyme preparation may be packaged separately in a water-insoluble package and said package placed in a container together with a frozen food.

Examples A–L of specific food packages are given below:

(A) A dehydrated food package comprising dehydrated bananas packed with an active enzyme preparation obtained from fresh bananas.

(B) A canned food package comprising canned carrots packed with an active enzyme preparation obtained from fresh carrots.

(C) A frozen food package comprising frozen mixed vegetables packed with active enzyme preparation obtained from the same fresh vegetables.

(D) A dehydrated food package comprising dehydrated watercress packed with an active enzyme preparation obtained from fresh watercress.

(E) A dehydrated food package comprising dehydrated watercress packed with an active enzyme preparation obtained from white mustard.

(F) A dehydrated food package comprising dehydrated cabbage packed with an active enzyme preparation obtained from fresh cabbage leaves.

(G) A dehydrated food package comprising dry skim milk or dry whole milk packed with an active enzyme preparation obtained from unpasteurized milk.

(H) A canned food package comprising canned tomato juice packed with an active enzyme preparation obtained from fresh tomatoes.

(I) Food packages as above, but where an antibiotic (such as chlorteracycline hydrochloride) is added to the processed food.

(J) Food packages as above, but where an antibiotic is added to the active enzyme preparation.

(K) Food packages as above, but where an antibiotic is added to the processed food and to the active enzyme preparation.

(L) Food packages as above, but where a conventional food stabilizing agent (such as sodium propionate) is added to the processed food.

The invention in its broader aspects is not limited to the specific steps, methods, compositions, combinations and improvements shown and described, but departures may be made therefrom within the scope of the accompanying claims without departing from the principles of the invention and without sacrificing its chief advantages.

What is claimed is:

1. The process of producing improved processed food by improving the natural flavor of a processed food containing a flavor precursor substrate representing a source of latent natural flavor and protected against the deteriorative effects of enzymes and microorganisms found in a corresponding fresh food, said process comprising bringing into contact with said processed food in the presence of water a specific enzyme preparation containing enzymes of such a nature as those normally found in the unprocessed food and having a catalytic effect to convert the latent flavor into patent flavor.

2. A process as in claim 1 wherein the processed food is heat processed.

3. A process as in claim 1 wherein the processed food is fruit.

4. A process as in claim 1 wherein the processed food is vegetable.

5. A process as in claim 1 wherein the processed food is milk.

6. A process as in claim 1 wherein the processed food is meat.

7. A process as in claim 1 wherein the processed food is fish.

8. A process as in claim 1 wherein the processed food is selected from the group consisting of processed apples, apricots, asparagus, bananas, beef, beets, blueberries, broccoli, cabbage, carrots, celery, cereal, chicken, corn, garlic, grapefruit, horseradish, leeks, lemons, milk, mustard, onions, oranges, parsley, peaches, peas, pineapple, salmon, spinach, strawberries, stringbeans, tomatoes and watercress.

9. A process as in claim 1 wherein there is incorporated in the improved processed food an antibiotic.

10. A process as in claim 1 wherein the processed food is processed by irradiation.

11. A process as in claim 1 wherein the processed food is dehydrated cabbage and the enzyme preparation is obtained from mustard.

12. The process of producing improved processed food by improving the natural flavor of a processed food containing a flavor precursor substrate representing a source of latent natural flavor and protected against the deteriorative effects of enzymes and micro-organisms found in a corresponding fresh food, said process comprising bringing into contact with said processed food in the presence of water a specific enzyme preparation, obtained from the unprocessed food, which has a catalytic effect to convert the latent flavor into patent flavor.

13. A process as in claim 12 wherein the processed food is heat processed.

14. A process as in claim 12 wherein the processed food is fruit.

15. A process as in claim 12 wherein the processed food is vegetable.

16. A process as in claim 12 wherein the processed food is milk.

17. A process as in claim 12 wherein the processed food is meat.

18. A process as in claim 12 wherein the processed food is fish.

19. A process as in claim 12 wherein the processed food is selected from the group consisting of processed apples, apricots, asparagus, bananas, beef, beets, blueberries, broccoli, cabbage, carrots, celery, cereal, chicken, corn, garlic, grapefruit, horseradish, leeks, lemons, milk, mustard, onions, oranges, parsley, peaches, peas, pineapple, salmon, spinach, strawberries, stringbeans, tomatoes and watercress.

20. A process as in claim 12 wherein there is incorporated in the improved processed food an antibiotic.

21. A process as in claim 12 wherein the enzyme preparation is obtained from the unprocessed food by treating it with cold acetone and drying the resulting precipitate.

22. A process as in claim 12 wherein the enzyme preparation is an air dried acetone precipitate derived from a liquid fraction of the unprocessed food.

23. A process as in claim 12 wherein the enzyme preparation is a freeze dried acetone precipitate of a water extract of the unprocessed food.

24. A process as in claim 12 wherein the enzyme preparation is a freeze dried acetone precipitate of a buffer extract of the unprocessed food.

25. A process as in claim 12 wherein the enzyme preparation is an air dried acetone precipitate of an alkaline extract of the unprocessed food.

26. A process as in claim 12 wherein the unprocessed food is an edible part of a plant and the enzyme is obtained from a part of the plant normally considered inedible.

27. A process as in claim 26 wherein the processed food is a citrus fruit and the enzyme is obtained from the fruit skin.

28. A process as in claim 12 wherein the processed food is treated by passing through charcoal in order to deflavorize it prior to the addition of the enzyme preparation.

29. A process as in claim 12 wherein the enzyme is obtained from a part of the unprocessed food normally considered to be edible.

30. A process as in claim 29 wherein the processed food is beef and the enzyme is obtained from an unprocessed sample of beef.

31. A process as in claim 12 wherein the processed food is powdered egg and the enzyme preparation is a freeze dried acetone precipitate derived from a citrate-phosphate buffer extract of unprocessed egg yolk.

32. A process as in claim 12 wherein the enzyme preparation is a vacuum dried acetone precipitate of a water extract of the unprocessed food.

References Cited in the file of this patent

UNITED STATES PATENTS

| | | |
|---|---|---|
| 1,609,720 | Humphery | Dec. 7, 1926 |
| 2,424,536 | Mayer et al. | July 22, 1947 |
| 2,453,109 | MacDowell | Nov. 9, 1948 |
| 2,598,838 | Schermerhorn | June 3, 1952 |
| 2,647,838 | Stone | Aug. 4, 1953 |
| 2,680,687 | Lemmonier | June 8, 1954 |
| 2,760,869 | Yanick | Aug. 28, 1956 |